July 4, 1939. W. A. HARRINGTON 2,164,612
CONNECTOR
Filed Oct. 24, 1938 2 Sheets-Sheet 1
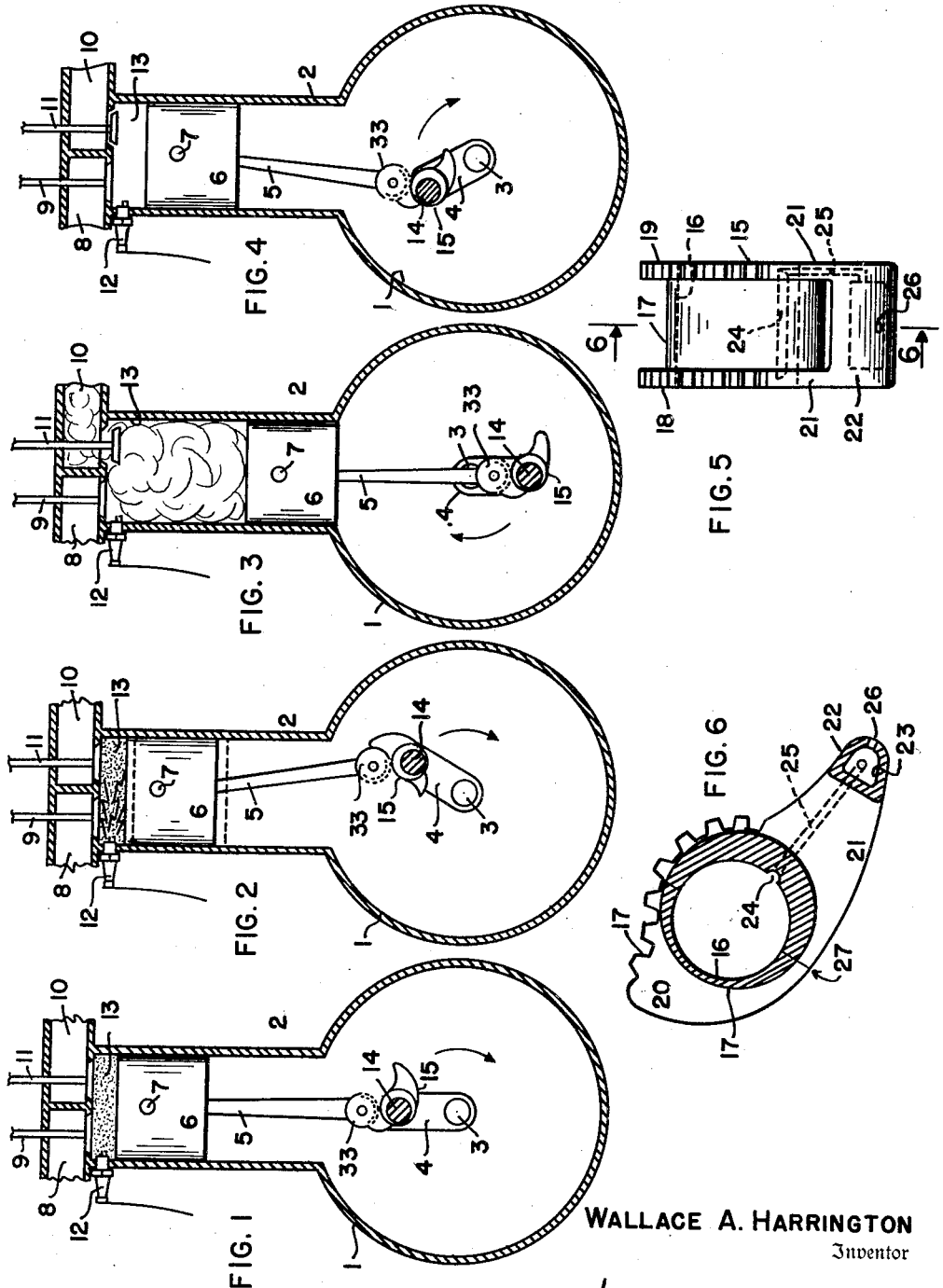
Wallace A. Harrington
Inventor
By Herbert E. Smith
Attorney July 4, 1939.  W. A. HARRINGTON  2,164,612
CONNECTOR
Filed Oct. 24, 1938    2 Sheets-Sheet 2
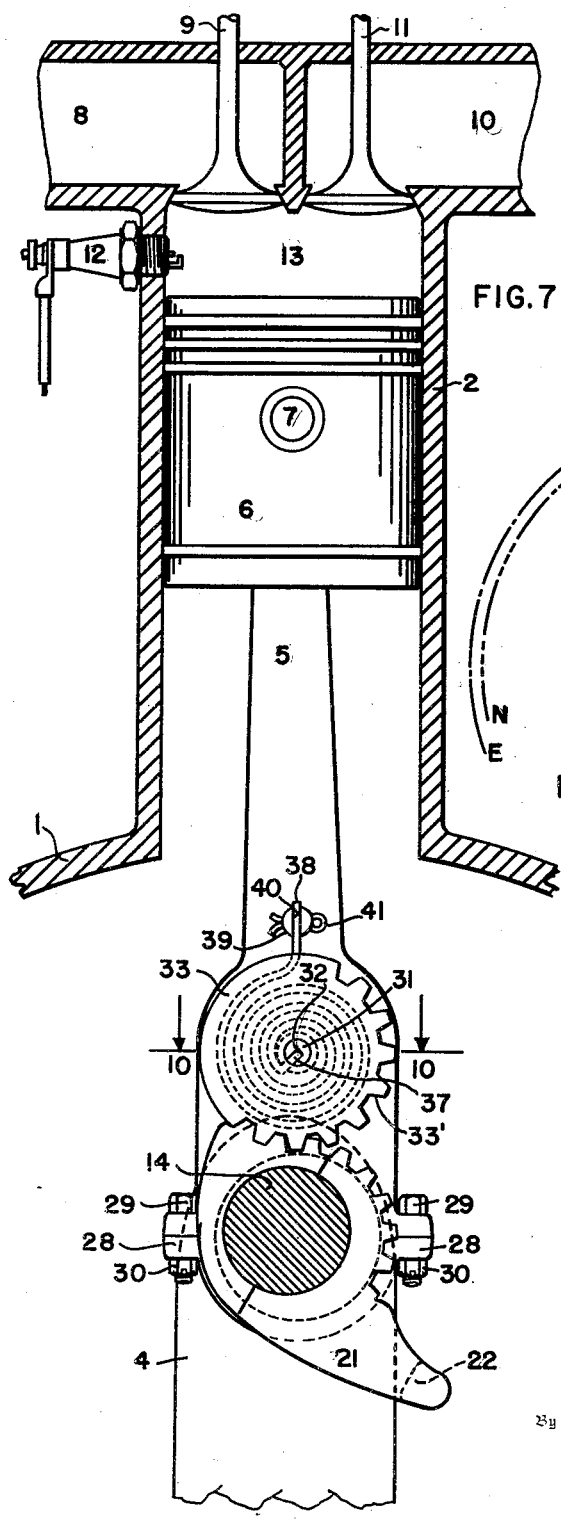
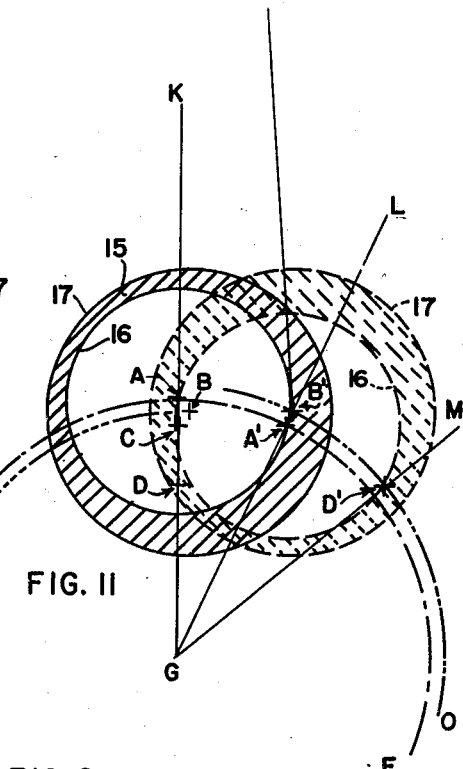
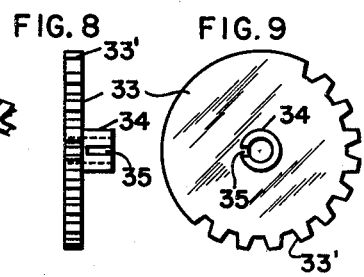
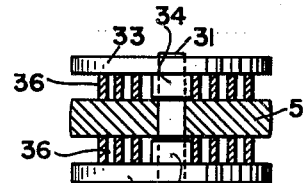
WALLACE A. HARRINGTON
Inventor
By Herbert E. Smith
Attorney Patented July 4, 1939

2,164,612

UNITED STATES PATENT OFFICE 2,164,612

CONNECTOR

Wallace A. Harrington, Spokane, Wash.

Application October 24, 1938, Serial No. 236,703

6 Claims. (Cl. 74—44)

My present invention relates to a new and useful improvement in a connector for use in conjunction with the crankshaft and connecting rod of a conventional engine of the internal combustion type, wherein a confined exploding gas operates upon a piston and a connecting rod to revolve or rotate a crankshaft for the production of power.

It is well known in the art of internal combustion engines that the efficiency of these engines is extremely low as at present constructed.

It is an object of my invention, therefore, to provide a device operating upon the crankshaft of an engine in conjunction with the connecting rod to raise the efficiency of the engine.

Another object of my invention is the provision of a device operating in conjunction with the crankshaft and connecting rod to delay or retard the downward stroke of the piston while maintaining the maximum compression and thereby increase its leverage upon the crankshaft when the compressed gases are exploded.

A further object of my invention is the provision of the device for the purpose herein described which can be simply and efficiently manufactured, and installed in a conventional engine without altering the construction of the engine.

A further object of my invention has been to provide a device that will result in a smooth operation of the engine by eliminating vibration.

A still further object of my invention is to provide a connector between the connecting rod and the crankshaft of the engine where the device will automatically compensate and adjust itself to varying conditions of speed.

Other objects and advantages of the invention will be apparent during the course of the following description.

In the accompanying drawings, forming a part of this specification, and in which like numerals are employed to designate like parts throughout the same:

Figures 1, 2, 3, and 4 are diagrammatic views showing the relative positions of the elements of an internal combustion engine in cooperation with the device of my invention;

Figure 5 is an end elevational view of the connector of my invention and Figure 6 is a vertical, sectional view taken on line 6—6 of Figure 5;

Figure 7 is an enlarged, partially diagrammatic view illustrating the device of my invention attached to the connecting rod and crank arm of a conventional engine;

Figures 8 and 9 are elevational views of the gear segment utilized in connection with the inventions of my device;

Figure 10 is a cross sectional view taken on line 10—10 of Figure 7; and

Figure 11 is a view diagrammatically detailing the operation of the device of my invention.

Referring now to Figures 1 through 4, inclusive, the numeral 1 indicates a crankcase of a conventional, internal combustion engine having a cylinder 2. A crankshaft 3 having a crank arm 4 is provided and suitably supported within the crank case 1. A crank 14 is carried on the crank arms 4. A connecting rod 5 operates between the crank 14 and a piston 6 and is pivotally connected to the piston by means of a wrist pin 7. A gas inlet chamber 8 and an inlet valve 9 are indicated in the upper portion of the cylinders which are also provided with an exhaust chamber 10 and exhaust valve 11. An igniter or spark plug 12 is shown communicating with the combustion chamber 13.

Upon the crank 14, carried by the crank arm 4, I mount my connector indicated as a whole by the Figure 15 which is of the form of a flanged eccentric bushing having an interior bearing surface 16 and a surface 17 exterior of and eccentric to the surface 16. Toothed flanges 18 and 19 are provided at either end of the eccentric bushing 15 and are extended as best seen in Figure 6 to form stops 20 and extension arms 21. Between the ends of the extension arms 21 I form a counterbalance 22 which may be hollow to provide a reservoir 25. A groove 24 in the bearing surface 16 collects surface oil from oil under pressure upon the exterior of the crank 14. An oil passage 25 extends through one or both of the arms 21 and connects the groove 24 with the reservoir 23. An outlet 26 is provided from the sump for the discharge of the contained oil. For convenience in installing the device around a crank the unit 15 is divided along the parting line 27 so that the device is segmental and the two halves may be installed to encircle the crank and be retained thereon when the connecting rod is secured in place.

It will be noted that the connecting rod 5 at its lower end partially encircles the eccentric surface 17. A bearing half 28 is attached to the end of the connecting rod by means of bolts 29, 29, and nuts 30, 30, which may be of the usual castellated type.

Above the connector in the longitudinal axis of the connecting rod I provide a shaft 31 having a groove 32 in each end. A segmental plate gear 33 is mounted upon each end of the shaft and is provided with a collar 34 having a slot in one side of the collar, as 35. A spiral spring 36 having an inner inturned end 37 engages in the slot 35 of the collar 24 and the slot 32 of the shaft 31. The outer end 38 of the spring is secured by means of a spring anchor pin 39 mounted upon the connecting rod. The spring end 38 engages in the slot 40 and is securely held from dislodgement by means of the cotter pin 41 anchored to the shaft 31.

*Method of operation*

The installation of my connector to the conventional crankshaft is very simply accomplished by a mechanic by fitting the segmental portions of the connector 15 around the crank 14 of a crankshaft 3. The end of the connecting rod which is curved to fit approximately one-half the circumference of the eccentric surface 17 is brought into engagement therewith. The detachable half of the connecting rod bearing surface is adjusted so that the lugs engage the lower end of the connecting rod and the bolts 29, 29 pass therethrough. As is customary, shims may be inserted in the usual manner to insure proper fit and nuts 30, 30 are run onto the threads of the bolts 29 and tightened. The connector device is thereby in its operative position on the crankshaft.

Previously the springs 36 have been mounted upon the interior surfaces of the gears 33 with the hooked end 37 engaging the slot 35 of the gear collar and the slot 32 of the shaft 31. The outer end 38 of the springs are anchored as best indicated in Figure 7. The gear teeth 33' of the gear 33 are brought into engagement with the teeth 17' on the flanges of the connector.

It is to be understood that when the connector is in the position indicated in Figure 1 and Figure 7 the springs 36 are wound up or fully tensed. As may best be seen in Figures 1, 2, 3, and 4, when the operation of the connector is shown diagrammatically throughout four points in a cycle of the crankshaft, the centrifugal force produced by the crankshaft is utilized through the operation of the elements of the connector to retard the downward stroke of the piston. In Figure 1 the crankshaft is shown in the highest point in its arc of travel, and the piston is also indicated as exerting full compression upon the gases in the compression chamber 13. It will be noted that the eccentric bushing is positioned in its minimum lifting position. At this moment the centrifugal force acting upon the counterbalance is practically spent allowing the springs 36 to begin their function of rotating the eccentric bushing through the operation of the gears 33. In Figure 2, where I have indicated the crankshaft in a position approximately 25° to the right of the upper dead-center, the springs 36 have operated to rotate the bushing 15 so that, in effect, a wedge has been inserted under the lower end of the connecting rod 5 thus compensating for the downward course of the crank 14 due to its arcuate travel. The piston 6 is thereby prevented from downward movement, permitting the maintenance of maximum compression in the chamber 13. When the compressed gases are fired, at the moment indicated in Figure 2, the power created acts upon the piston to urge the connecting rod and crank downwardly in the usual manner. This power stroke continues until the piston and crankshaft assume the position of the showing of Figure 3, which is the lower dead-center of the cycle of operation. As the crank starts upwardly in its arcuate path, centrifugal force acts upon the arms 21 and the counterbalance 22 to rotate the connector eccentric bushing in a clockwise direction until it is prevented from further rotation by the stops 20 contacting the peripheries of the gear segments 33. This position is illustrated in Figure 4.

Because of the retardation of the firing moment, the crank drops in its arcuate path in a higher ratio than is the case in a conventional engine immediately following the moment of firing. The result thereby obtained is a greatly increased leverage upon the crank arm permitting the explosive force to dissipate itself to a greater degree in urging the piston down. The dissipation of this force more efficiently upon the piston will reduce the loss through the walls of the cylinders and result in an increase in the efficiency in an engine embodying the principles of my invention.

The operation of a reservoir 23 is to provide a variable weight for the counterbalance between the arms 21 of my connector. The first revolutions of an internal combustion engine are necessarily slow while the engine is accelerating and the gas mixture is blending to the point where smooth running will result. Under such conditions the action of centrifugal force upon the counterbalance will not be as great as at the higher speeds. If additional weight were not provided the relatively equal tension, under all conditions, of the springs 36 would tend to revolve the gear segments 33 and unbalance the connector from its customary operable position. To overcome this difficulty oil is collected from the oil feed lines of the customary crank by means of the groove 24 from where it passes into the reservoir 23 through the oil passage 25.

The outlet 26 which has been provided will allow a certain portion of this oil to bleed out of the reservoir and escape into the crankcase. As the revolutions of the crankshaft increase, and the centrifugal force increases in proportion thereto, the oil within the reservoir will more rapidly bleed out and deplete the supply to a point where it affords no appreciable additional weight in the countershaft.

Figure 11 is a diagrammatic view for the purpose of explaining the operation of my connector in its cooperation with the crank and crankshaft, as well as to indicate the relative positions assumed by the piston in relation to the crank under varying conditions. The eccentric 15 is shown in solid lines and by cross hatching in the position which it assumes at upper dead center of the crank circle. A portion of the crank circle is represented by EAF and has the center point G which coincides with the central, longitudinal axis of the crankshaft unit. The line GK represents the upper dead center of the crank arm, and the point A is the intersection of line GK with the curve EAF. Lines GL and GM which are spaced about 25° apart represent two positions of the crank arm. The intersection of the curve EAF with line GL is labelled as point A' which is the center of the crank when the arm travels to a position 25° to the right of dead center. The curve NB is an arc scribed by the center point of the eccentric surface 17 of the connector 15. By drawing a horizontal line through the point A', the intersection of that line with GK at C gives the distance AC which is the downward stroke of a piston of a commercial gas engine in the first twenty-five degrees of travel of the crank arm. Due to the action of the spring 36 the eccentric bushing 15 is revolved about the center, as A, of the crank and the center B of the eccentric travels in a horizontal plane tangential to the curve NB to the point B'. The curve B'O is scribed about the center G and represents the path of travel of the point B' immediately subsequent to the firing moment of my engine.

A horizontal line drawn through the point D', which is the intersection of curve B'O with line GM, intersects line GK at D. It is to be noted that points A and B' are upon the same horizontal plane due to the action of the eccentric bushing showing the manner in which maximum compression is maintained in the compression chamber. Hence, in comparison with the conventional piston travel AC during the first 25° of the crank circle after firing, the piston of an engine embodying my invention will have a travel represented by distance AD, that is approximately three times as great as AC.

Under certain conditions it is contemplated that the action of the return springs will, of necessity, have to be supplemented by auxiliary means which may consist of a leaf spring attached to the connecting rod so as to act upon the stops 20 of my connector and start the connector revolving at the moment that centrifugal force ceases to act and hold the connector against the return springs.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus fully described my invention, what I claim as new and desire to secure by Letters Patent is:

1. In an internal combustion engine, the combination with a piston, a connecting rod and a crankshaft, of a connector member between the crank and the connecting rod comprising an eccentric bushing having flanges on its ends, gear segments formed in the flanges, stops formed at one end of the segment, and arms extending from the flanges supporting a centrifugal weight at their ends, segmental gears mounted for rotation upon the connecting rod and engaging the gear segments of the connector, and return springs anchored to the connecting rod and to the segmental gears.

2. A connector member between a crank and a connecting rod comprising an eccentric bushing, flanges on the bushing, gear teeth on a portion of the flanges, a stop adjacent one end of the gear teeth, and arms extending from the flanges and supporting a centrifugal weight at their ends, segmental gears mounted for rotation upon the connecting rod and engaging the gear segments of the connector, and return springs operable upon the gear segments.

3. A connector member between a crank and a connecting rod comprising an eccentric bushing, flanges on the bushing, gear teeth on a portion of the flanges, and arms extending from the flanges and supporting a centrifugal weight at their ends; segmental gears mounted for rotation upon the connecting rod and engaging the gear segments of the connector, and return springs operable upon the gear segments.

4. A connector member between a crank and a connecting rod comprising an eccentric bushing adapted to encircle the crank and be engaged by the lower end of the connecting rod, gear teeth on the bushing, and spaced arms extending from the bushing and supporting a centrifugal weight at their ends; a segmental gear mounted for rotation upon the connecting rod and engaging the gear teeth of the bushing, and a return spring operable upon the gear segments.

5. A connector member between a crank and a connecting rod comprising an eccentric bushing adapted to encircle the crank and be engaged by the lower end of the connecting rod, gear teeth on the bushing, and spaced arms extending from the bushing and supporting a centrifugal weight at their ends having an interior reservoir provided with a drainage hole and an oil passage from the interior of the bushing within one of said arms communicating with said reservoir; a segmental gear mounted for rotation upon the connecting rod and engaging the gear teeth of the bushing, and a return spring operable upon the gear segment.

6. A connector member between a crank and a connecting rod comprising an eccentric bushing adapted to encircle the crank and be engaged by the lower end of the connecting rod, gear teeth on the bushing, and spaced arms extending from the bushing and supporting a centrifugal weight at their ends; a segmental gear having a slotted central collar and mounted for rotation upon the lower end of the connecting rod and engaging the gear teeth on the bushing, and spring means cooperating with the slotted hub of the gear segments and anchored to the connecting rod to rotate the eccentric bushing.

WALLACE A. HARRINGTON.